(12) United States Patent
Lai

(10) Patent No.: US 6,363,658 B1
(45) Date of Patent: Apr. 2, 2002

(54) FLOWER POT

(76) Inventor: Yuan-Song Lai, No. 32, Fuyi Rd., Taiping City, Taichung County (TW)

( * ) Notice: Subject to any disclaimer, the term of this patent is extended or adjusted under 35 U.S.C. 154(b) by 0 days.

(21) Appl. No.: 09/685,673

(22) Filed: Oct. 11, 2000

(51) Int. Cl.⁷ .............................................. A01G 25/00
(52) U.S. Cl. ........................... 47/79; 119/246; 47/65.5; 47/48.5
(58) Field of Search ............................. 47/79, 65, 65.5, 47/65.7, 66.6, 66.1, 86, 59, 62, 48.5; 119/246, 245; 210/602; 220/216; 137/409

(56) References Cited

U.S. PATENT DOCUMENTS

| | | | | |
|---|---|---|---|---|
| 4,041,641 A | * | 8/1977 | Dietz | 47/17 |
| 4,117,805 A | * | 10/1978 | Ward | 119/5 |
| 4,236,352 A | * | 12/1980 | Heaney et al. | 47/80 |
| 4,745,707 A | * | 5/1988 | Newby | 47/79 |
| 4,754,571 A | * | 7/1988 | Riechmann | 47/59 |
| 4,885,870 A | * | 12/1989 | Fong | 47/79 |
| 5,040,489 A | * | 8/1991 | Drake | 119/5 |
| 5,097,626 A | * | 3/1992 | Mordoch | 47/79 |
| 5,127,366 A | * | 7/1992 | Kim | 119/5 |
| 5,618,428 A | * | 4/1997 | Oslund | 210/602 |
| 5,921,025 A | * | 7/1999 | Smith | 47/79 |

FOREIGN PATENT DOCUMENTS

| | | | | |
|---|---|---|---|---|
| EP | 0195542 | * | 9/1986 | A01G/27/00 |

* cited by examiner

Primary Examiner—Peter M. Poon
Assistant Examiner—Andrea M. Valenti
(74) Attorney, Agent, or Firm—Rosenberg, Klein & Lee

(57) ABSTRACT

A pot body is mounted in a transparent water container and defining a first water chamber on the inside and a second water chamber on the outside, a soil holder is mounted in the pot body above the first water chamber to hold soil for growing plants, and a flexible tube is connected to a bottom through hole of the pot body and controlled by a float to close/open a split on it subject to the level of water in the first water chamber, enabling water to flow from the second water chamber to the first water chamber for plants growing in soil in the soil holder when the water in the second water chamber drops below a lower limit level.

2 Claims, 6 Drawing Sheets

FLOWER POT

BACKGROUND OF THE INVENTION

The present invention relates to a flowerpot having a water chamber defined within a transparent water container outside the pot body thereof for keeping living fish, animals and plants and, more particularly, to such a flowerpot, which uses a float-driven flexible tube to control water passage from the water chamber to the inside space of the pot body for growing plants automatically.

Conventional flowerpots are simply adapted to hold soil for growing plants. People must regularly water soil in flowerpots so that plants can grow well. However, maintaining much water in soil will make the plants rot. There is also known flowerpots having a water chamber outside the pot body for keeping living fish, animals and plants. FIG. 1 shows a flowerpot of this kind. As illustrated in FIG. 1, the flowerpot comprises a transparent water container 1, a pot body 2 mounted in the transparent water container 1 and adapted to hold soil for growing plants, a water chamber H defined within the water container 1 outside the pot body 2 for keeping living fish, animals and plants, and an absorptive member 3 mounted in a bottom through hole of the pot body 2 and adapted to deliver water from the water chamber H to soil in the pot body 2. This structure of flowerpot is still not satisfactory in function. The drawbacks of this structure of flowerpot are as follows:

1. Because the absorptive member 3 has a lower part dipped in water in the water chamber H and an upper part embedded in soil in the pot body 2, it never stops from watering soil in the pot body 2, and much water will be maintained in soil in the pot body 2.
2. When the absorptive member 3 starts to wear or becomes hardened after a long use, water cannot be efficiently delivered from the water chamber H to soil in the pot body 2, causing soil in the pot body 2 unable to get sufficient water.
3. Because the water chamber 2 surrounds the pot body 2, the plants growing in soil in the pot body 2 cannot get sufficient fresh air.

SUMMARY OF THE INVENTION

The invention has been accomplished under the circumstances in view. It is one object of the present invention to provide a flowerpot, which is adapted to grow plants and to keep living fish, animals and plants. It is another object of the present invention to provide a flowerpot, which automatically controls the supply of water to soil for growing plants. It is still another object of the present invention to provide a flowerpot with means to guide outside fresh air to the roots of the plants growing in soil in the pot body. It is still another object of the present invention to provide a flowerpot, which enables the user to pump air in water in the water chamber adapted for keeping living fish, animals and plants. According to one aspect of the present invention, the flowerpot comprises a transparent water container, a pot body mounted in the transparent water container, a first water chamber defined in the pot body, a second water chamber defined within the water container outside the pot body for keeping living fish, animals and plants, a soil holder mounted in the pot body above the first water chamber and adapted to hold soil for growing plants, and a water level control device floating in the first water chamber and adapted to close/open the water passage between the first water chamber and the second water chamber subject to the level of water in the first water chamber, enabling water to flow from the second water chamber to the first water chamber for plants growing in soil in the soil holder when the water in the second water chamber drops below a lower limit level. According to another aspect of the present invention, the water level control device is comprised of a connector mounted in a bottom through hole on the bottom wall of the pot body, a float flowing on water in the first water chamber, and a flexible tube connected between the connector and the float and controlled by the float to close/open a split thereof subject to the elevation of the level of water in the first water chamber. According to still another aspect of the present invention, the water container has an upright air tube formed integral with the bottom wall thereof and inserted through the bottom air tube of the pot body for guiding outside fresh air to the roots of the plants growing in soil in the pot body through air holes in the soil holder.

DETAILED DESCRIPTION OF THE PREFERRED EMBODIMENT

Figure 1:
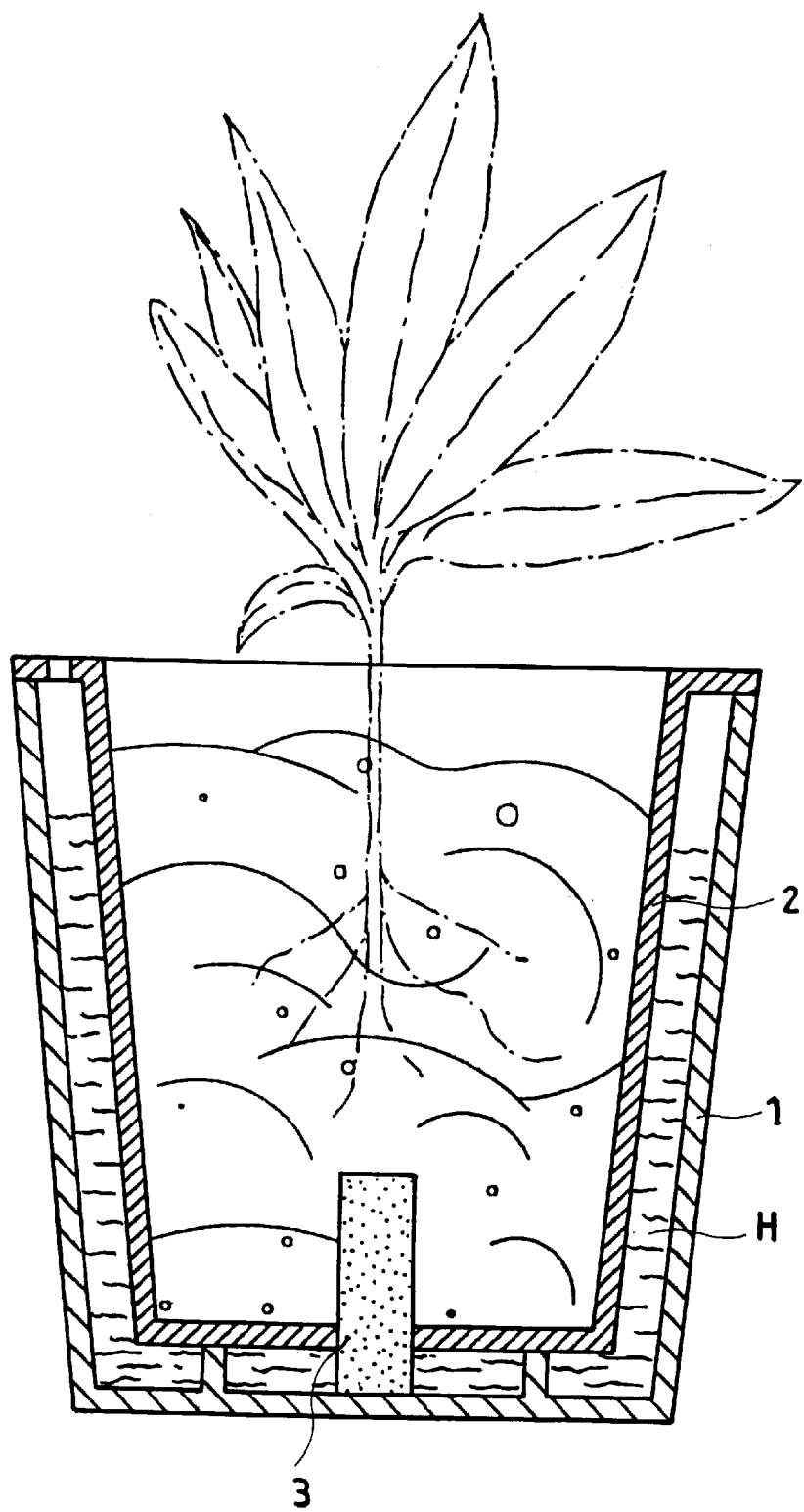
FIG. 1 is a sectional view of a flowerpot with integrated aquarium constructed according to the prior art.
Figure 2:
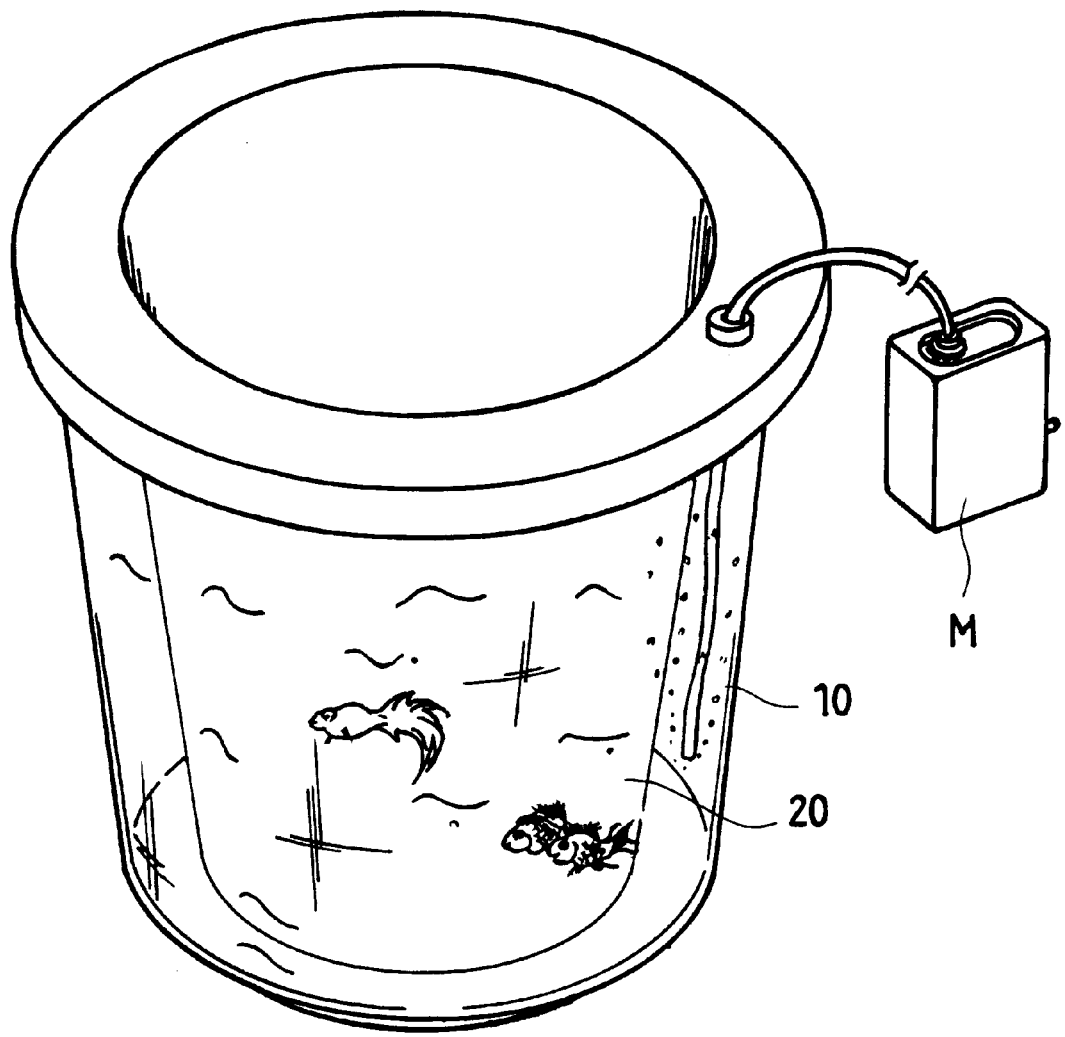
FIG. 2 is a perspective view of a flowerpot according to the present invention.
Figure 3:
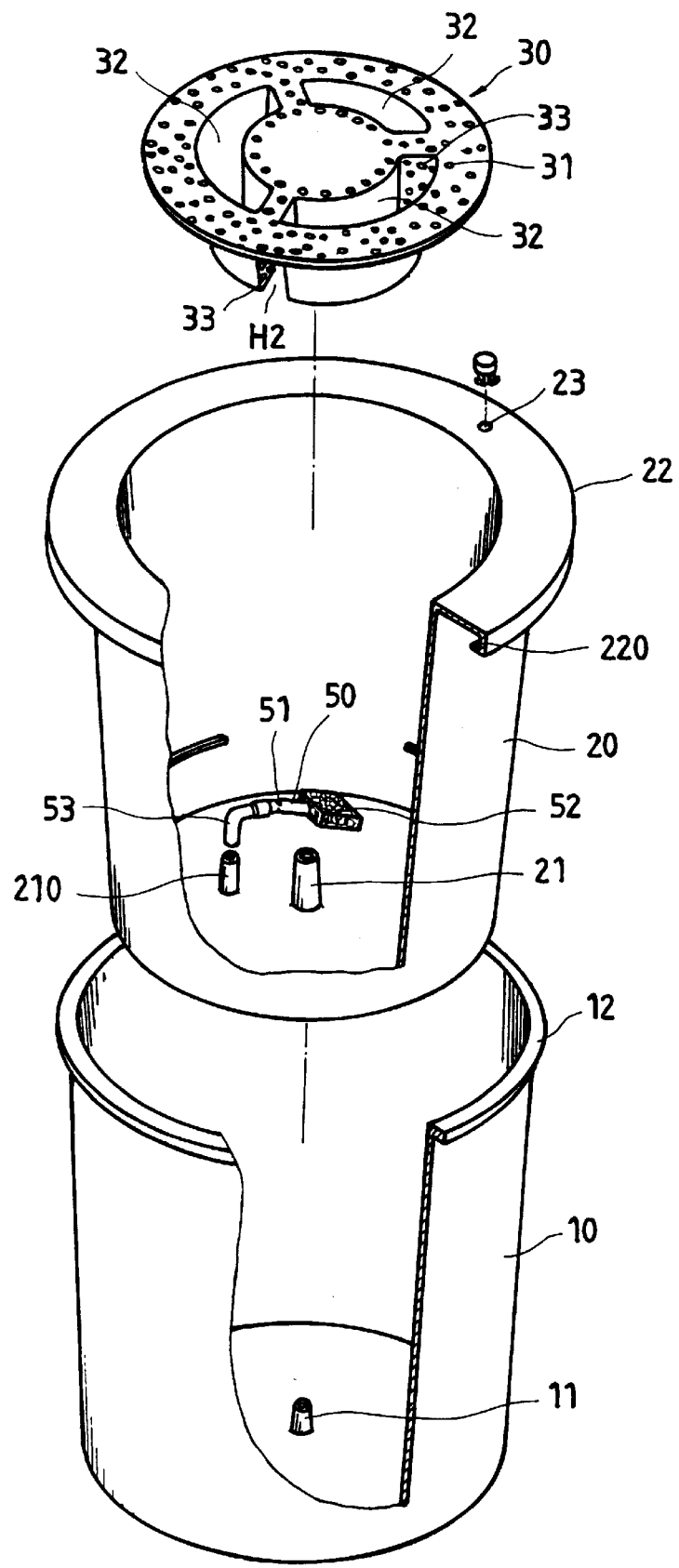
FIG. 3 is an exploded view of the flowerpot according to the present invention.
Figure 3A:
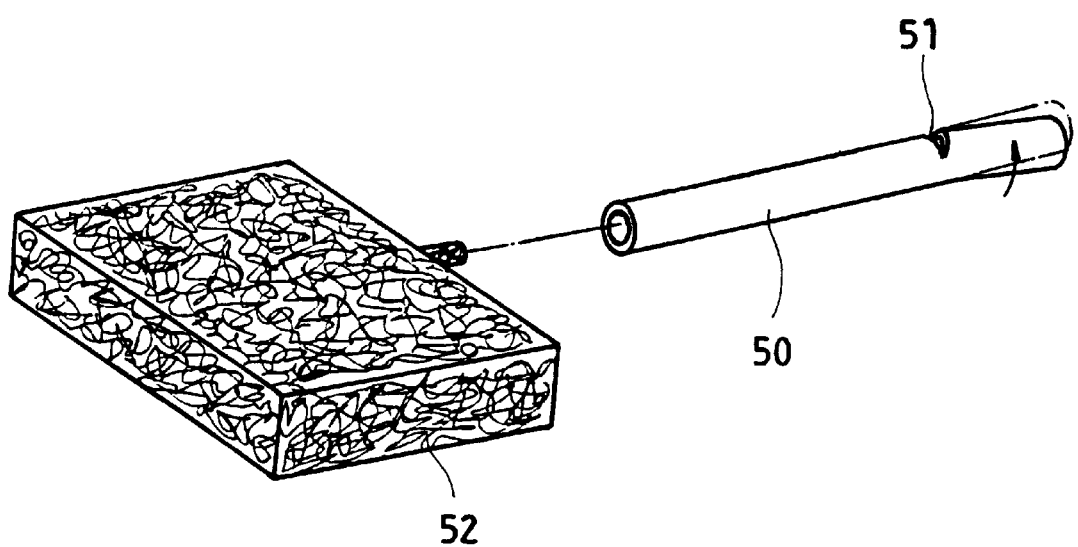
FIG. 3A is an exploded view of a part of the water level control device for the flowerpot according to the present invention.

Referring to FIGS. 2, 3 and 3A, a flowerpot in accordance with the present invention is generally comprised of a water container 10, a pot body 20, and a soil holder 30. The water container 10 is a transparent, cylindrical, top-open shell having a rim 12 on the top open side thereof and a short, tapered, upright air tube 11 integral with the bottom side wall thereof at the center. The pot body 20 is mounted within the water container 10 and suspended from the rim 12, comprising a rim 22 disposed on the top open side thereof and supported on the rim 12 of the water container 10, and a short, tapered, upright air tube 21 formed integral with the bottom wall thereof at the center and press-fitted onto the air tube 11 of the water container 10. After installation of the pot body 20 in the water container 10, a water chamber H1 is defined Within the inside wall of the water container 10 and the outside wall of the pot body 20 for keeping living fish, water animals and plants. The rim 22 of the pot body 20 comprises a hooked portion 220 hooked on the bottom side wall of the rim 12 of the water container 10, and a through hole 23. The soil holder 30 is mounted inside the pot body 20 and adapted to keep soil in the pot body 20 for growing plants, comprising a plurality of air vents 31, a plurality of top open chambers 32, a plurality of bottom open chambers H2, and a plurality of water holes 33 disposed in communication between the top open chambers 32 and the bottom open chambers H2.

Figure 4:
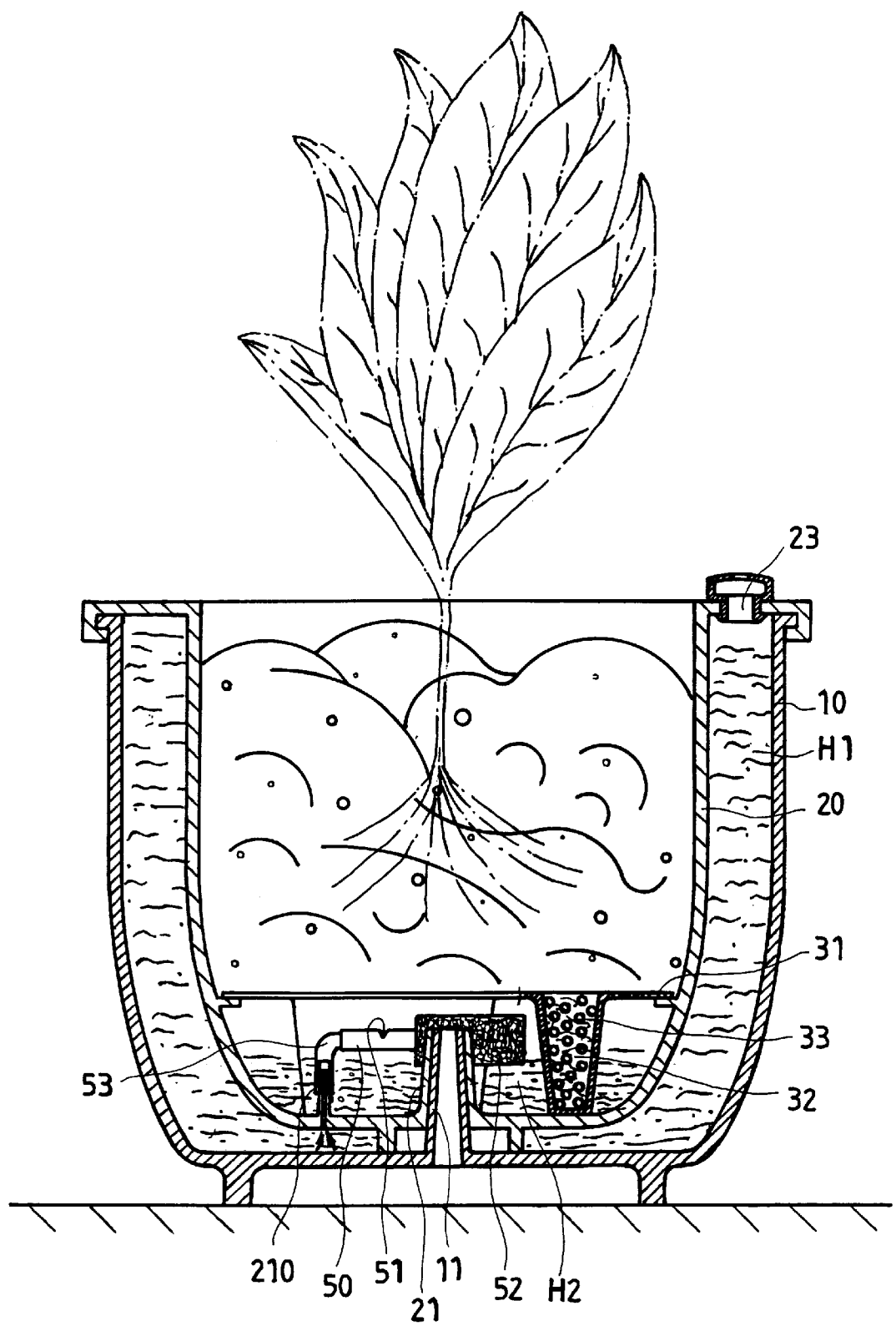
FIG. 4 is a sectional view showing the use of the present invention.

Referring to FIG. 4 and FIGS. 2, 3 and 3A again, the pot body 20 further comprises a through hole 210 through the bottom wall, and a water level control device fastened to the through hole 210 and adapted to control the level of water in the pot body 20 below the soil holder 30. The water level control device is comprised of a flexible tube 50, a connector 53 connected between the through hole 210 and one end of the flexible tube 50, and a float 52 connected to the other end of the flexible tube 50 and floating on water in the pot body 20. The flexible tube 50 has a split 51.

Referring to FIGS. 2 and 4 again, soil is carried on the soil holder 30 in the pot body 20 for growing plants. Because the soil holder 30 has air vents 31 and water holes 33 in communication between the bottom open chambers H2 and the top open chambers 32, outside air can pass through the air tube 11 of the water container 10 to soil through the air vents 31, and water can pass from the water chamber H1 through the through hole 210, the connector 53, the split 51 of the flexible tube 50, and the bottom open chambers H2 and water holes 33 of the soil holder 30 to wet soil. Therefore, water and air are automatically supplied to the roots of plants growing in soil in the pot body 20. Further, living fish, water animals and plants can be kept in water in the water chamber H1. Because the water container 10 is transparent, people can see living fish, water animals and plants in the water chamber H1 from the outside of the flowerpot. When keeping living fish, water animals and plants in water in the water chamber H1, fresh air can be pumped through the through hole 23 on the rim 22 of the pot body 20 into water in the water chamber H1 by an air pump M.

Figure 5A:
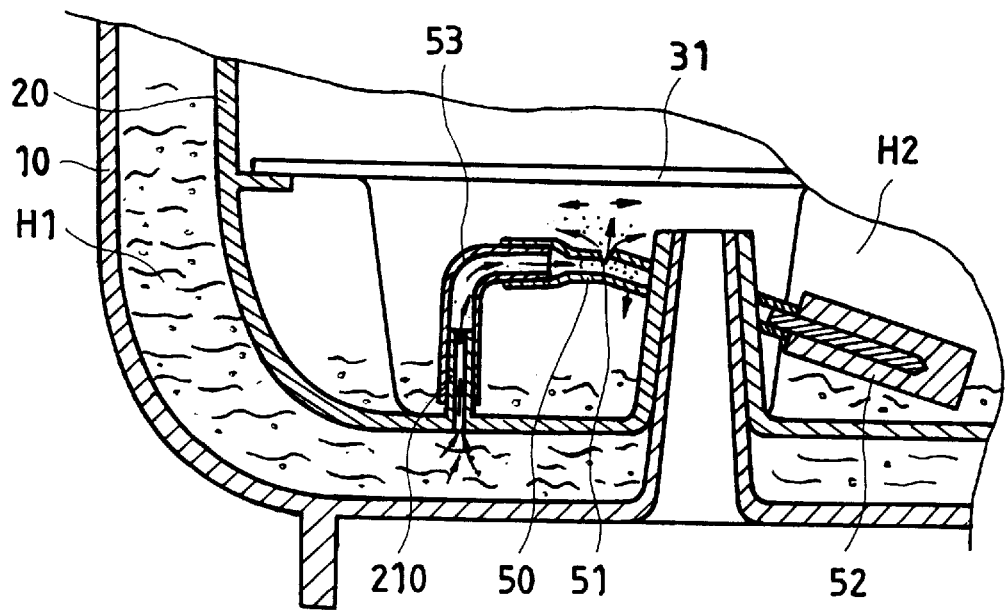
FIG. 5A is a sectional view of a part of the present invention, showing the water level lowered in the pot body, the split of the flexible tube opened.
Figure 5B:
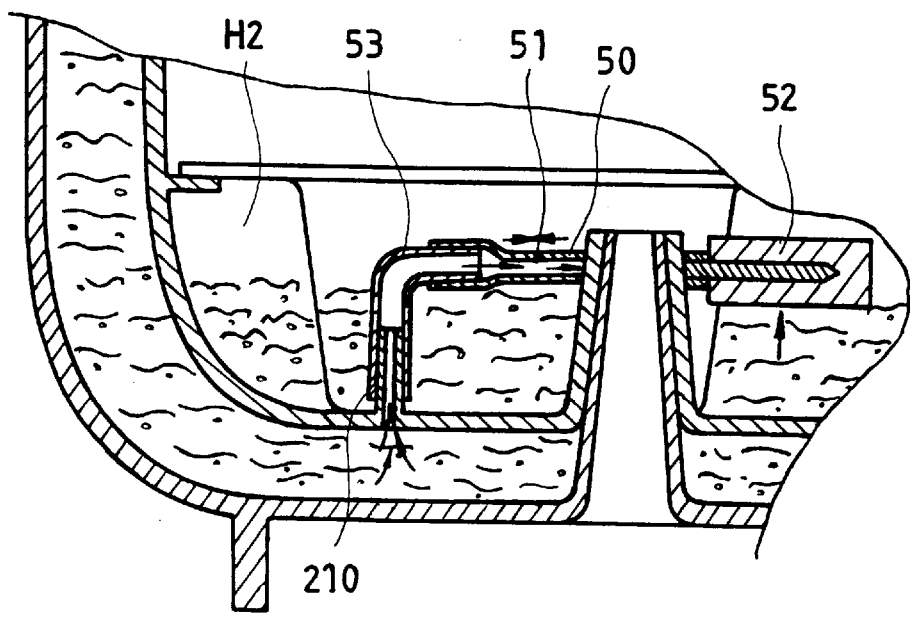
FIG. 5B is a sectional view of a part of the present invention showing the water in the pot body reached the upper limit level, the split of the flexible tube closed.

Referring to FIGS. 5A and 5B and FIG. 4 again, when the water in the pot body 20 reaches a predetermined upper limit level, the float 52 holds the flexible tube 50 in a horizontal position, and at this time the flexible tube 50 closes the split 51 to stop water from passing through the through hole 210, i.e., water is stopped from entering the pot body 20 (see FIG. 5A). On the contrary, when the water in the pot body 20 drops below a predetermined lower limit level, the float 52 is lowered with the water in the pot body 20, the flexible tube 50 is turned downwards to open the split 51, enabling water to flow from the water chamber H1 through the through hole 210 to the inside of the pot body 20 and then to soil on the soil holder 30 through the bottom open chambers H2 and the water holes 33 (see FIG. 5A).

What the invention claimed is:

1. A flowerpot comprising a water container, a pot body mounted in said water container, said pot body having a through hole through a bottom wall thereof, a first water chamber defined within said water container around said pot body and holding water for keeping living fish, animals and plants, a soil holder mounted in said pot body and adapted to hold soil inside said pot body for growing plants, a second water chamber defined within said pot body and disposed in communication with said first water chamber through the through hole on the bottom wall of said pot body, and water level control means adapted to control water level in said pot body, wherein said water level control means comprises a float floating on water in said second water chamber, a connector fixedly connected to the through hole on the bottom wall of said pot body, and a flexible tube connected between said connector and said float, said flexible tube having a split, which is opened for letting water pass from said first water chamber to said second water chamber when said float is lowered with the water in said second water chamber to a predetermined lower limit level, or closed to stop water from passing from said first water chamber to said second water chamber when said float is lifted with the water in said second water chamber to a predetermined upper limit level.

2. The flowerpot of claim 1 wherein said water container is made of transparent material.

* * * * *